No. 682,442. Patented Sept. 10, 1901.
W. F. WILLIAMS.
ELASTIC TIRE.
(Application filed May 13, 1901.)

(No Model.)

Witnesses:

Inventor
William F. Williams
By Munn
Attorneys

United States Patent Office.

WILLIAM FREDERICK WILLIAMS, OF LONDON, ENGLAND.

ELASTIC TIRE.

SPECIFICATION forming part of Letters Patent No. 682,442, dated September 10, 1901.

Application filed May 13, 1901. Serial No. 59,988. (No model.)

*To all whom it may concern:*

Be it known that I, WILLIAM FREDERICK WILLIAMS, a subject of the King of Great Britain, residing at 17 and 18 Great Pulteney street, Golden Square, London, England, have invented new and useful Improvements in Elastic Tires, of which the following is a specification.

This invention has for its object to enable the elasticity of a hollow tire and its capacity to resist crushing under the load to be readily increased at will; and the improvement consists in the combination, with a hollow tire, of an internal solid elastic core or cushion of such different cross-sectional shape to that of the hollow or space within which it is contained that while affording a direct internal support to the tread portion of the tire vacant spaces will be left at the sides of the core or cushion, so that the core or cushion will have perfect freedom for expansion laterally when under compression by the load without liability of extension in the longitudinal direction. This internal supporting-cushion may be applied within hollow tires of various sectional forms and be itself of various forms, the essential feature in all cases being that it is of such form as not to fill the space within which it is contained.

The invention is illustrated in the accompanying drawings, which represent a few examples of various sectional forms of internal elastic cushion applied within hollow tires of various internal forms.

Figure 1:
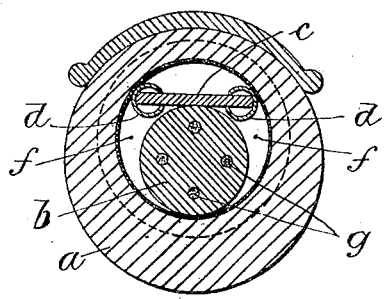
Figure 2:
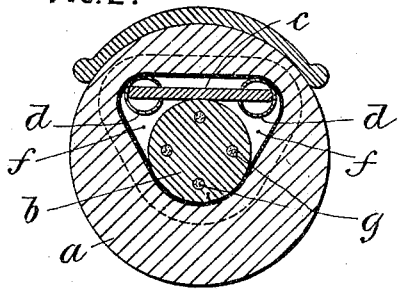
Figure 3:
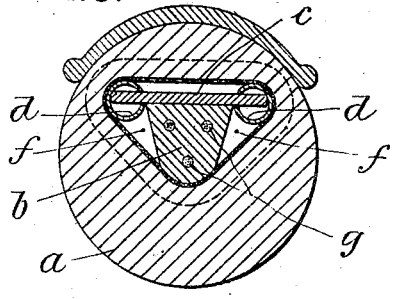

Figure 1 shows a cross-section of a tire having a bore of circular section containing a holding-on band and a core of circular section. Fig. 2 shows a cross-section of a tire having a bore of triangular section containing a holding-on band and a core of circular section, and Fig. 3 shows a cross-section of a tire having a bore of triangular section containing a holding-on band and a core of approximately triangular section.

$a$ is the tire, of circular or other external form in cross-section and of any desired internal cross-sectional form.

$b$ is the internal supporting cushion or core, of rubber.

In Fig. 1 the tire is of circular form externally and internally and is supposed to be clasped to the wheel-rim by a holding-on band $c$, provided upon its edges with tubular sheaths $d$ to prevent cutting of the tire against the edges of the band. The elastic core or cushion $b$ is contained within the tire in the space between the tread of the tire and the band $c$. It is of circular section and of such diameter as to fill such space in the direction of the pressure of the load, so that such pressure will be transmitted to the band $c$ as an abutment for the cushion or core $b$; but the core $b$ being of circular section, while the space within which it is contained being in the form of a segment of a circle, vacant spaces will be left, as at $f$, which permit of the free lateral expansion of the core or cushion $b$ under compression. To prevent longitudinal extension of the core or cushion, the latter may in all cases have cords $g$ embedded in it, these cords having knots at intervals, so as to form a multiplicity of points of resistance to prevent the cords tearing out of the rubber.

In Fig. 2 a hollow tire is shown of triangular form in internal cross-section having a cushion or core $b$ of circular section, and in Fig. 3 a tire of similar form is shown having a cushion or core $b$ of triangular or prismatic form in cross-section, the essential feature of the invention—namely, the combination of such relative forms that lateral vacant spaces $f$ are left for the lateral expansion of the core—being the common feature of all these arrangements, which, as above mentioned, represent only a few of the possible forms in which the improvement may be embodied.

The core or cushion $b$ would in all cases be made of rubber vulcanized to the degree of elasticity suitable to the tire to which it is to be applied and to the load which the tire is to be called upon to sustain, and being made separate from the tire and merely threaded through the same along with or separately from the holding-on band the core or cushion $b$ may be readily exchanged for another which is more or less elastic, as the case may be, whenever it is required to adapt the tire to suit altered conditions of load.

I claim—

The combination with a hollow elastic tire, of an internal solid elastic core or cushion of highly-elastic rubber having embedded therein non-extensible cords knotted at intervals and of such different cross-sectional shape to that of the bore or portion of the bore within which it is contained, that vacant lateral spaces will be left between the core or cushion and the sides of the tire, so that while affording internal support to the tread portion of the tire, the core or cushion will have perfect freedom for lateral expansion under compression by the load, as described.

WILLIAM FREDERICK WILLIAMS.

Witnesses:
 THOMAS W. KENNARD,
 C. G. CLARK.